(12) United States Patent
Fujiwara

(10) Patent No.: US 6,715,881 B2
(45) Date of Patent: Apr. 6, 2004

(54) PRESENTATION SUPPORT SYSTEM AND PROJECTOR SYSTEM

(75) Inventor: Shuichi Fujiwara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 34 days.

(21) Appl. No.: 09/726,531

(22) Filed: Dec. 1, 2000

(65) Prior Publication Data
US 2001/0003479 A1 Jun. 14, 2001

(30) Foreign Application Priority Data

Dec. 9, 1999 (JP) ............................. 11-350288

(51) Int. Cl.7 .................... G03B 21/00; G09G 5/00
(52) U.S. Cl. ........................................ 353/21; 345/730
(58) Field of Search ................. 353/21, 122; 345/520, 345/156, 730

(56) References Cited

U.S. PATENT DOCUMENTS

| | | | | |
|---|---|---|---|---|
| 5,204,768 A | * | 4/1993 | Tsakiris et al. | 340/825.72 |
| 5,307,055 A | * | 4/1994 | Baskin et al. | 340/825.62 |
| 5,428,417 A | * | 6/1995 | Lichtenstein | 353/122 |
| 6,186,630 B1 | * | 2/2001 | Miyashita | 353/42 |
| 6,225,976 B1 | * | 5/2001 | Yates et al. | 341/21 |
| 6,345,897 B1 | * | 2/2002 | Furuhata | 353/122 |

FOREIGN PATENT DOCUMENTS

| | | |
|---|---|---|
| JP | 04-261582 | 9/1972 |
| JP | 63-250721 | 10/1988 |
| JP | 06-110416 | 4/1994 |
| JP | 09-97018 | 4/1997 |
| JP | 09-97039 | 4/1997 |
| JP | 11-249634 | 9/1999 |

* cited by examiner

Primary Examiner—Russell Adams
Assistant Examiner—D. Ben Esplin
(74) Attorney, Agent, or Firm—Oblon, Spivak, McClelland, Maier & Neustadt, P.C.

(57) ABSTRACT

The presentation support system comprises a projector that displays presentation images utilized in a presentation, a presentation support device that produces support information for supporting the presentation according to the progress status of the presentation, and a support information display device that displays the support information. The projector is equipped with a support controller that supplies the support information display device with the support information supplied from the presentation support device.

10 Claims, 11 Drawing Sheets

Fig.7

PRESENTATION MODE SUPPORT DATA

| PAGE | ALLOTTED TIME | ALLOTTED ELAPSED TIME | NOTES |
|---|---|---|---|
| 001 | 4 |  | * * * * * * * * * * * * * * * |
| 002 | 4 | 4 | * * * * * * * * * * * * * * * |
| 003 | 4 | 8 | * * * * * * * * * * * * * * * |
|  |  | . . . |  |
| 008 | 4 | 28 | EXPLAIN ABOUT * * * <br><br> * * * * * * * * * * * * <br><br> * * * * * * * * * * <br><br> * * * * * * * * * * * * * * * |
| 009 | 4 | 32 | * * * * * * * * * * * * * * * |
| 010 | 4 | 36 | * * * * * * * * * * * * * * * |
| END |  | 40 |  |

Fig. 9

QUESTION AND ANSWER MODE SUPPORT DATA

| CATEGORY NUMBER | CATEGORY | NOTES |
|---|---|---|
| 001 | ******* ***** ** | ** *** **** **** **** **** **** **** **** **** **** **** **** **** **** **** **** **** **** *** |
| 002 | ****** **** ** | ** ** ** ** ** ** ** ** ** ** ** ** ** ** ** ** *** *** *** *** |
| ... | ... | ... |
| 009 | ***** ***** ** | * * * * * * * * * * * * * ** ** ** *** **** |
| 010 | ***** ***** ** | * ** ** ** ** ** ** ** ** ** ** ** ** *** *** *** *** *** |

… # PRESENTATION SUPPORT SYSTEM AND PROJECTOR SYSTEM

BACKGROUND OF THE INVENTION

1. Field of the Invention

The present invention relates to a presentation support system and a projector system.

2. Description of the Related Art

Projectors are frequently used in presentations because they allow images represented by input image signals to be displayed in enlarged form on a screen. The presenter moves through the presentation while using a projector to display images for the presentation that have been prepared beforehand (hereinafter referred to as "presentation images").

Prior to actually giving a presentation, the presenter usually conducts a rehearsal and fine tunes the contents of the presentation, how the presentation proceeds (eg, its pace), and so forth so that the presentation will be conducted more efficiently and effectively within the allotted time. In an actual presentation, however, it is not unusual for the pace of the presentation to pick up, or for the presenter to forget to give certain details or point out the images being displayed, for instance. Accordingly, a problem is that the actual presentation is not always as efficiently or effectively conducted as it could be.

SUMMARY OF THE INVENTION

An object of the present invention is thus to provide a technique for supporting a presenter so that the presentation will be conducted more efficiently and effectively.

In order to attain at least part of the above and other related objects of the present invention, there is provided a presentation support system. The presentation support system comprises: a projector configured to display presentation images to be used in a presentation; a presentation support device configured to produce support information for supporting the presentation according to a progress status of the presentation, and to provide the support information to the projector; and a support information display device configured to display the support information. The projector is equipped with a support controller configured to supply the support information display device with the support information provided from the presentation support device.

In the above-mentioned presentation support system, support information for supporting a presentation is displayed on a support information display device according to the progress status of the presentation, allowing the presenter to utilize the support information displayed on the support information display device. Therefore, the above-mentioned presentation support system supports a presenter so that the presentation will be conducted more efficiently and effectively.

The support information may include information indicating an elapsed time and remaining time determined by monitoring the progress status of the presentation over time. The support information may also include progress-related information obtained by comparing a progress determined by monitoring the progress status of the presentation over time with a previously registered progress.

If the support information includes the above-mentioned information, the presenter will be able to ascertain the elapsed time and remaining time or the progress of the presentation. As a result, if the presenter decides that the progress is too rapid, the pace of the presentation can be slowed, and conversely, if it is decided that the progress is too slow, the pace can be increased, allowing the progress of the presentation to be adjusted.

The support information preferably includes information indicating notes related to the presentation image being displayed.

If this is the case, then the presenter can, for example, confirm the details related to the image being displayed, whether an image has been pointed out, and so forth.

The support information may include information indicating notes not related to the presentation image.

If this is the case, then, for example, by preparing answers to likely questions as support information beforehand, and displaying this information on the support information display device during the question and answer period, the presenter can easily obtain answers to the questions displayed on the support information display device when these questions are actually asked.

The support information display device may be a remote control capable of communication with the projector.

If this is the case, then, for example, the presenter can check the support information while controlling the operation of the projector using a remote control in the course of a presentation, which makes checking the support information relatively easy.

These and other objects, features, aspects, and advantages of the present invention will become more apparent from the following detailed description of the preferred embodiments with the accompanying drawings.

BRIEF DESCRIPTION OF THE DRAWINGS

FIG. 7 is a diagram of the data for every page of each presentation image in the presentation mode out of the support data group 126;

FIG. 9 is a diagram of the data related to the category titles and notes about likely questions in the question and answer mode out of the support data group 126;

DESCRIPTION OF THE PREFERRED EMBODIMENT

A. Structure of the Presentation Support System

Figure 1:
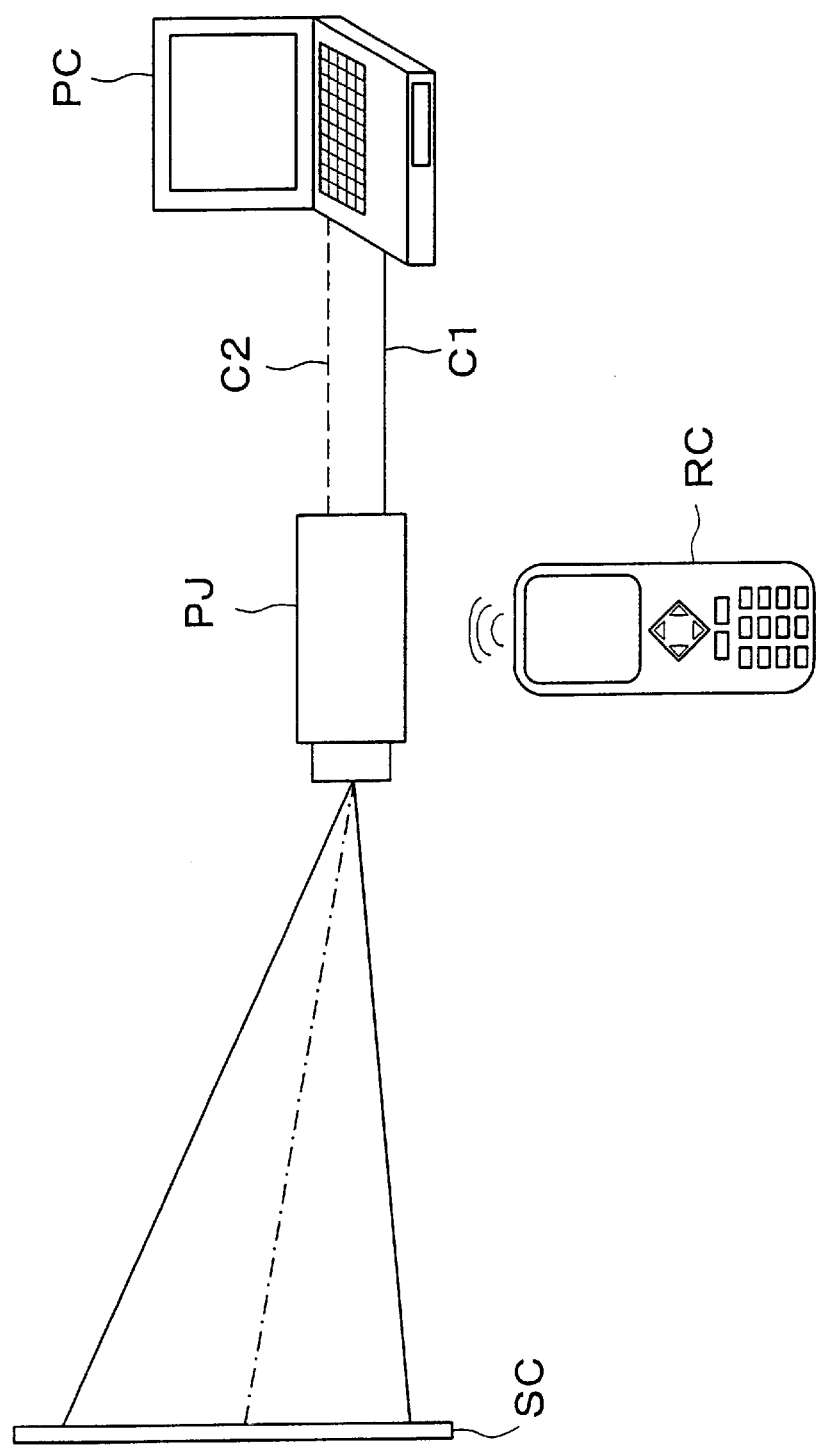
FIG. 1 is a diagram illustrating a presentation support system as an embodiment of the present invention.

FIG. 1 is a diagram illustrating a presentation support system as an embodiment of the present invention. This presentation support system includes a projector PJ, a remote control RC, and a presentation device PC. The projector PJ and the remote control RC constitute the projector system of the present invention.

The image input terminal of the projector PJ is connected to the image output terminal of the presentation device PC via a connector cable C1. The control signal terminal of the projector PJ is connected to the control signal terminal of the presentation device PC via a connector cable C2.

The projector PJ projects and displays on a screen SC an image representing an image signal AV1 outputted via the connector cable C1. The projector PJ and the presentation device PC are controlled by control signals sent to and received from one another via the connector cable C2. The remote control RC and the projector PJ are mutually controlled by infrared communication. The user can use the remote control RC to set the operating conditions of the projector PJ. The remote control RC is also provided with a mouse pointer function, allowing a pointer to be displayed over the screen image displayed by the projector PJ.

Figure 2:
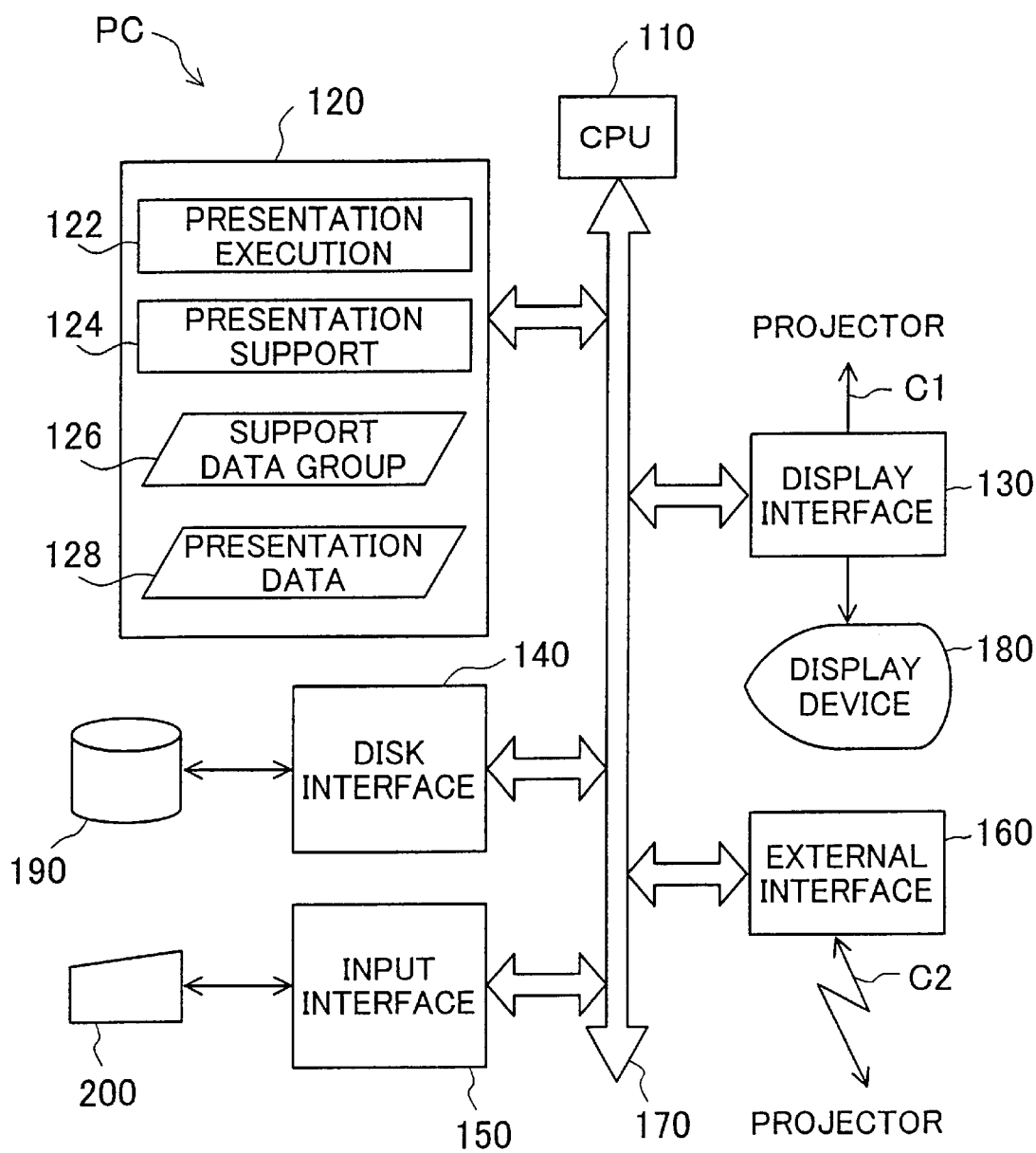
FIG. 2 is a block diagram illustrating an example of the presentation device PC.

The presentation device PC includes a typical personal computer system. FIG. 2 is a block diagram illustrating an example of the presentation device PC. This presentation device PC comprises a CPU 110, a memory 120, a display interface 130, a disk interface 140, an input interface 150, and an external interface 160, with these various blocks connected to each other by a bus 170. The display interface 130 is connected to a display device 180 and to the presentation device PC via the connector cable C1. The display interface 130 has a function to supply image signals to the display device 180 and the projector PJ via the display interface 130. The disk interface 140 is connected to a hard disk drive 190 or to a floppy disk drive, CD-ROM drive, or other such external memory device (not shown). The disk interface 140 has a function to execute the reading and writing of programs or data to the connected external memory device. The input interface 150 is connected to a keyboard 200 or to a mouse, tablet, or other such input device (not shown). The input interface 150 has a function to transmit the instructions and commands input from the input device to the CPU 110. The external interface 160 is connected to the external connector of the projector PJ. The external interface 160 has a function to transmit the instructions and commands from CPU 110 to the external connector, and the instructions and commands from the external connector to the CPU 110. Various external interfaces can be used as the external interface 160, such as an RS-232C interface or an SCSI interface.

There are stored in the memory 120 a computer program that functions as a presentation execution section 122, a computer program that functions as a presentation support section 124, a support data group 126, and presentation data 128. The presentation execution section 122 has a function to supply an image that is stored as the presentation data 128 and utilized during presentation execution (hereinafter referred to as a "presentation image") to the projector PJ via the display interface 130. The presentation support section 124 has a function to select suitable support data from among the data stored as the support data group 126 according to the progress status of the presentation, and this data is supplied to the projector PJ via the external interface 160. These functions will be described further below.

The computer programs for implementing the presentation execution section 122 and the presentation support section 124 are provided in a form in which they are stored on a floppy disk, a CD-ROM, or another such portable recording medium, and are transferred from this recording medium to an external memory device of the computer system (such as the hard disk drive 190). When the various functions are to be implemented, the computer program is transferred from the external memory device to the memory 120, and executed by the CPU 110. The computer program recorded on a recording medium may also be directly executed by the computer.

In this Specification, "computer" is a concept that encompasses hardware devices and operating programs, and refers to a hardware device that operates under the control of an operating system. When an operating system is unnecessary and a hardware device is operated with an application program alone, this hardware device itself corresponds to a computer. The hardware device comprises at least a microprocessor such as a CPU, and means for reading a computer program recorded on a recording medium. The computer program includes program codes for causing this computer to implement the functions of the various means discussed above. Some of the above functions may be implemented by an operating system rather than an application program.

A flexible disk, CD-ROM, opto-magnetic disk, IC card, ROM cartridge, punch card, a medium printed with symbols such as a bar code, an internal memory device of the computer (memory such as RAM or ROM), an external memory device, or a variety of other computer-readable media can be utilized as the "recording medium" in the present invention.

Figure 3:
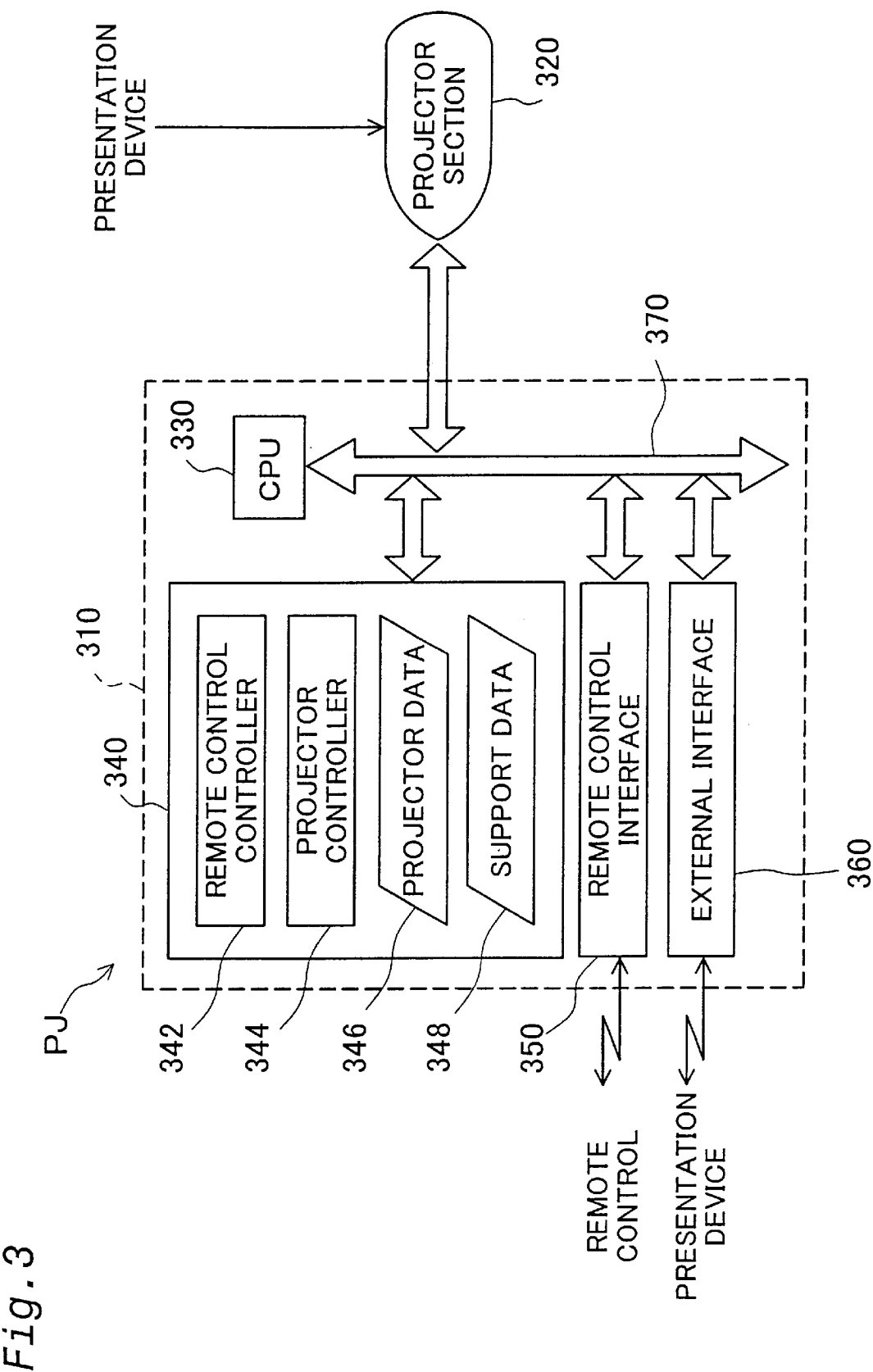
FIG. 3 is a block diagram illustrating an example of the projector PJ.

FIG. 3 is a block diagram illustrating an example of the projector PJ. The projector PJ includes a controller 310 and a projector section 320. The controller 310 includes a CPU 330, a memory 340, a remote control interface 350, and an external interface 360. The CPU 330, memory 340, remote control interface 350, external interface 360, and projector section 320 are connected to one another by a bus 370.

The external interface 360 is connected to the presentation device PC. The external interface 360 of the projector PJ has a function to receive the instructions and commands sent from the external interface 160 of the presentation device PC and transmit them to the CPU 330, and a function to transmit the instructions and commands sent from the CPU 330 to the external interface 160 of the presentation device PC.

The remote control interface 350 has a function to transmit the instructions and commands input from the remote control RC to the CPU 330, and transmit the instructions and commands from the CPU 330 to the remote control RC. A variety of other wireless communication interfaces can be used instead of an infrared communication interface as the remote control interface 350. Wired communication interfaces can also be used, just as with the external interface 360 of the presentation device PC and the external interface 160 of the projector PJ.

The memory 340 stores a computer program that functions as a remote control controller 342 and a computer program that functions as a projector controller 344 when executed by the CPU 330, as well as projector data 346 and support data 348. The projector controller 344 has a function to control the operation of the projector section 320 according to the projector data 346 indicating the operating conditions of the projector section 320. The projector section 320 projects and displays the images supplied from the presentation device PC in accordance with the control performed by the projector controller 344.

The remote control controller 342 controls the remote control RC via the remote control interface 350, and controls the presentation device PC via the external interface 360.

For example, the support data 348 supplied from the presentation device PC is first stored in the memory 340, and then supplied to the remote control RC via the remote control interface 350. Alternatively, the instructions and commands transmitted from the remote control RC are transmitted to the projector controller 344, or are transmitted to the presentation device PC via the external interface 360. These functions will be discussed further below.

The computer programs that implement the remote control controller 342 and the projector controller 344 are stored in a non-volatile memory (not shown), transferred to the memory 340 when the various functions are to be implemented, and is executed by the CPU 110.

Figure 4:
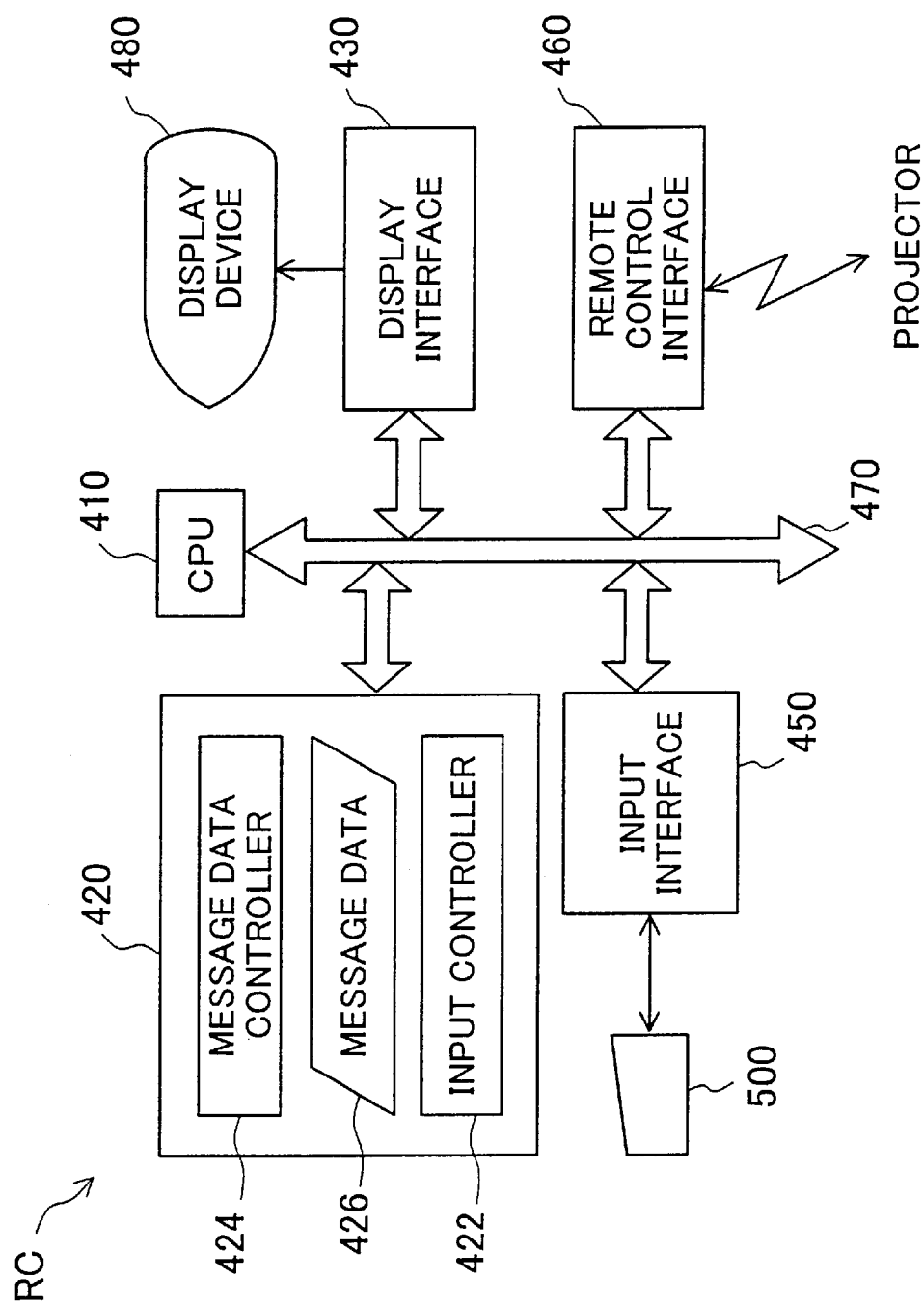
FIG. 4 is a block diagram illustrating an example of the remote control RC.

FIG. 4 is a block diagram illustrating an example of the remote control RC. The remote control RC comprises a CPU 410, a memory 420, a display interface 430, an input interface 450, and a remote control interface 460, with these various blocks connected to each other by a bus 470. The display interface 430 is connected to a display device 480. The display interface 430 has a function to supply display signals to the display device 480. The input interface 450 is connected to an input device 500 having various input buttons, such as selection and instruction buttons. The input interface 450 has a function to transmit the instructions and commands input from the input device 500 to the CPU 410.

The remote control interface 460 has a function to receive the instructions and commands sent from the remote control interface 350 of the projector PJ and transmit them to the CPU 410, and a function to send the instructions and commands from the CPU 410 to the remote control interface 350.

The memory 420 stores a computer program that functions as an input controller 422 and a computer program that functions as a message data controller 424 when executed by the CPU 410, as well as message data 426. The input controller 422 has a function control the operation of an input interface 450. The message data controller 424 has a function to store the support data supplied from the projector PJ via the remote control interface 460 in the memory 420 as the message data 426, and a function to display the message data 426 on the display device 480 via the display interface 430. These functions will be discussed further below.

B. Operation of the Presentation Support System

Figure 5:
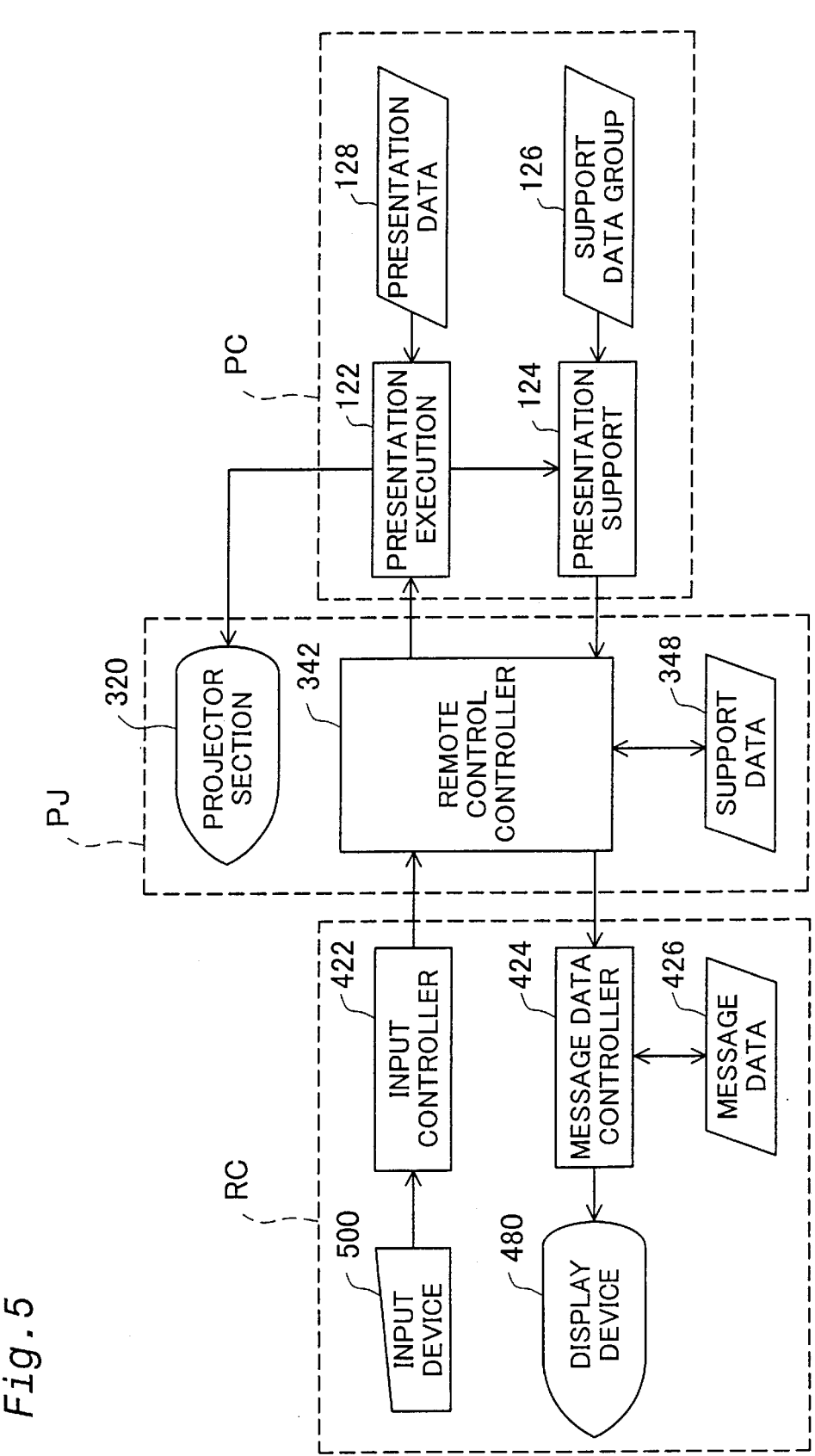
FIG. 5 is a diagram illustrating the functional structure of the presentation support system when a presentation is given.

FIG. 5 is a diagram illustrating the functional structure of the presentation support system when a presentation is given. To simplify the description, there are not shown the input interface 150 and the external interface 160 of the presentation device PC, the remote control interface 350 and the external interface 360 of the projector PJ, and the display interface 430 and the input interface 450 of the remote control RC.

The operation of the presentation support system may be broadly classified into two types. One is a process in which the presenter is making a speech along with displayed presentation images (hereinafter referred to as the "presentation mode"), and the other is a process in which a question and answer session or the like is conducted upon completion of the scheduled presentation (hereinafter referred to as the "question and answer mode").

First, let us discuss the presentation mode. When the presenter uses the input device 500 of the remote control RC to start the presentation, a presentation start command is transmitted from the input controller 422, through the remote control controller 342 of the projector PJ, and to the presentation execution section 122 of the presentation device PC. As a result, the presentation execution section 122 commences the display of the presentation images. Also, when the presenter uses the input device 500 to switch display screens, the presentation execution section 122 reads the data of the next presentation images and outputs it to the projector section 320. The projector section 320 displays the supplied presentation images.

An example of the computer program for implementing this presentation execution section 122 is Microsoft PowerPoint (trademark of Microsoft Corp.).

The presentation support section 124 receives display screen information (such as image switching information or the page number of a presentation image) from the presentation execution section 122 every time the display screen is to be switched, and reads the data corresponding to the received display screen information out of the support data group 126. The remote control controller 342 stores the support data 348 in the memory 340 (FIG. 3), reads the stored support data 348, and supplies it to the message data controller 424 of the remote control RC. The message data controller 424 stores the support data 348 as the message data 426 in the memory 420 (FIG. 4), and reads the stored message data 426 and outputs it to the display device 480. The display device 480 displays a message image which the message data 426 represents.

Figure 6:
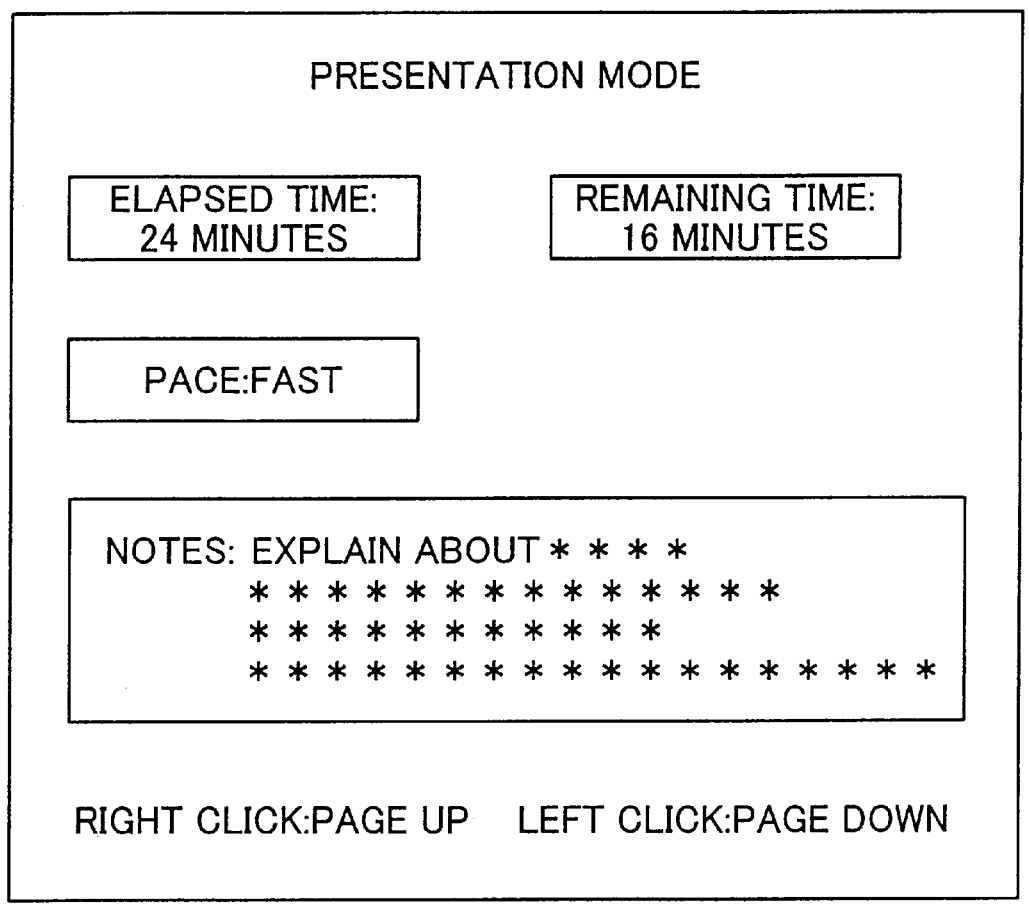
FIG. 6 is an example of a display screen displayed on the display device 480 of the remote control RC in the presentation mode.

FIG. 6 is an example of a display screen displayed on the display device 480 of the remote control RC in the presentation mode, and in this example the elapsed time, remaining time, pace (progress) of the presentation, and notes are displayed. The elapsed time indicates the time that has elapsed from the start of the presentation, and the remaining time indicates the time remaining until the end of the scheduled presentation. The pace of the presentation indicates whether the presentation is moving along as scheduled. The notes indicate such things as details to be explained about the presentation image currently being displayed by the projector PJ, and actions the presenter should take, such as "point out the image."

As shown in FIG. 7, data for every page of each presentation image in the presentation mode is stored in the support data group 126 of the presentation device PC. The allotted time indicates the expected time period for the presentation of each page, and the allotted elapsed time indicates the expected amount of elapsed time from the start of the presentation at the start of the display of the presentation image on each page.

The elapsed time and remaining time are determined by monitoring the time from the start of the presentation in the presentation support section 124. They may also be determined by having the presentation support section 124 receive the elapsed time determined by monitoring with the presentation execution section 122.

The pace (progress) can be determined by comparing the elapsed time with the allotted elapsed time when the display screen is switched. For example, the elapsed time is judged "normal" if it is within ±1 minute of the allotted elapsed time, "slow" if it is +3 minutes, and "fast" if it is −3 minutes. Alternatively, the discrepancy from the allotted elapsed time may be used directly. The above is merely an example of judging the pace, and other ways are also possible.

At least one of the elapsed time and remaining time determined as above, the pace of the presentation, and the notes become the support data 348. The elapsed time and remaining time, the pace of the presentation, and notes are not the only things can be displayed on the display device 480 of the remote control RC in the presentation mode, and various other types of support data to which the presenter can refer during a presentation may also be displayed as message data. For instance, the page number of the presentation image being displayed, or the allotted elapsed time for every page may be displayed. Also, the allotted elapsed time, the actual elapsed time, or the like may be displayed in analog rather than digitally.

Figure 8:
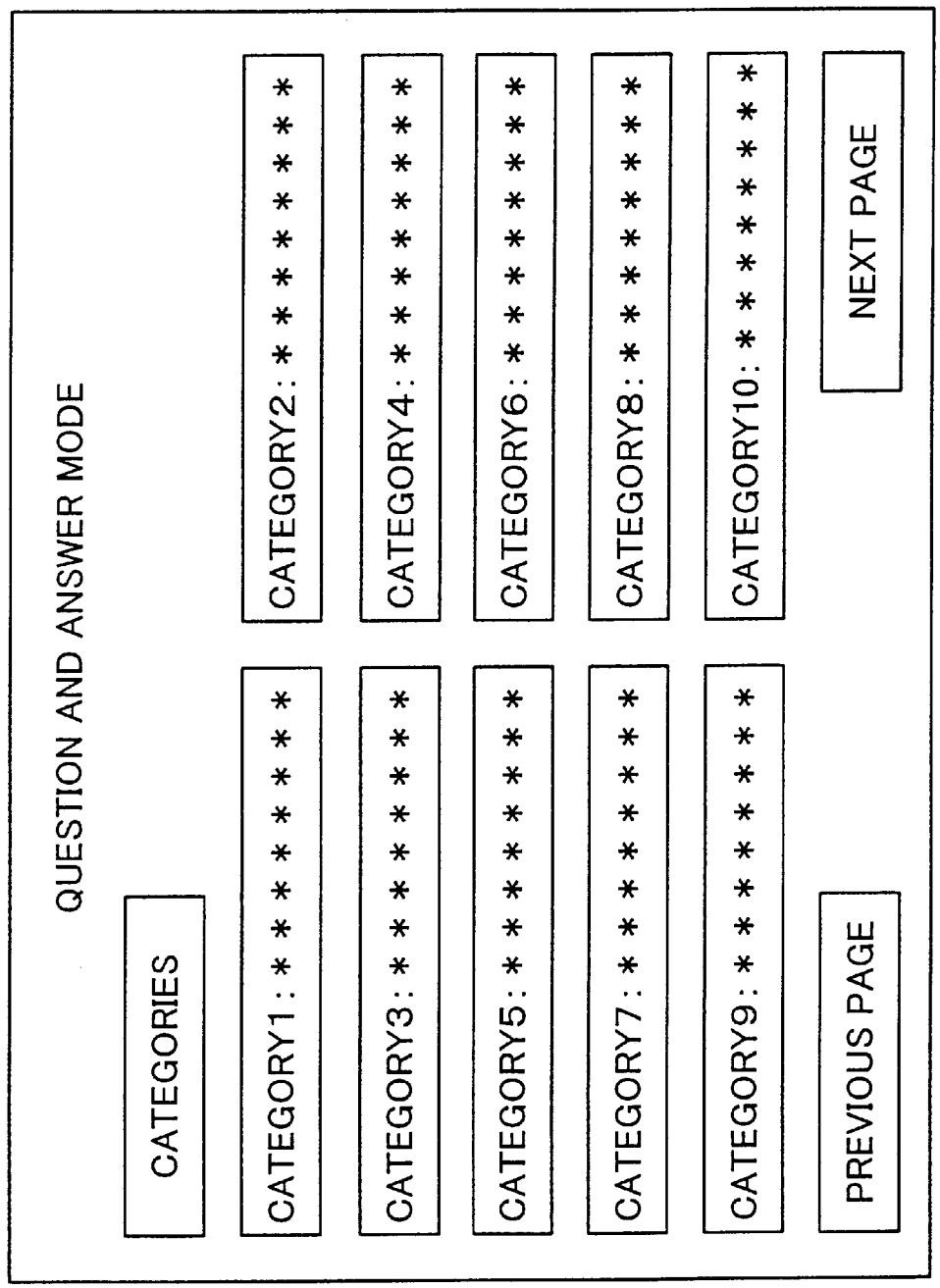
FIG. 8 is a diagram of an example of the display screen displayed on the display device 480 of the remote control RC in the question and answer mode.

The question and answer mode is executed on completion of the presentation mode. Alternatively, it is executed when the presenter send an instruction to begin the mode with the input device 500 of the remote control RC. FIG. 8 is an example of the display screen displayed on the display device 480 of the remote control RC in the question and answer mode, where a table of contents indicating likely question categories is displayed. The support data group 126 of the presentation device PC stores data related to the category titles and notes about likely questions in the question and answer mode, as shown in FIG. 9.

Figure 10:
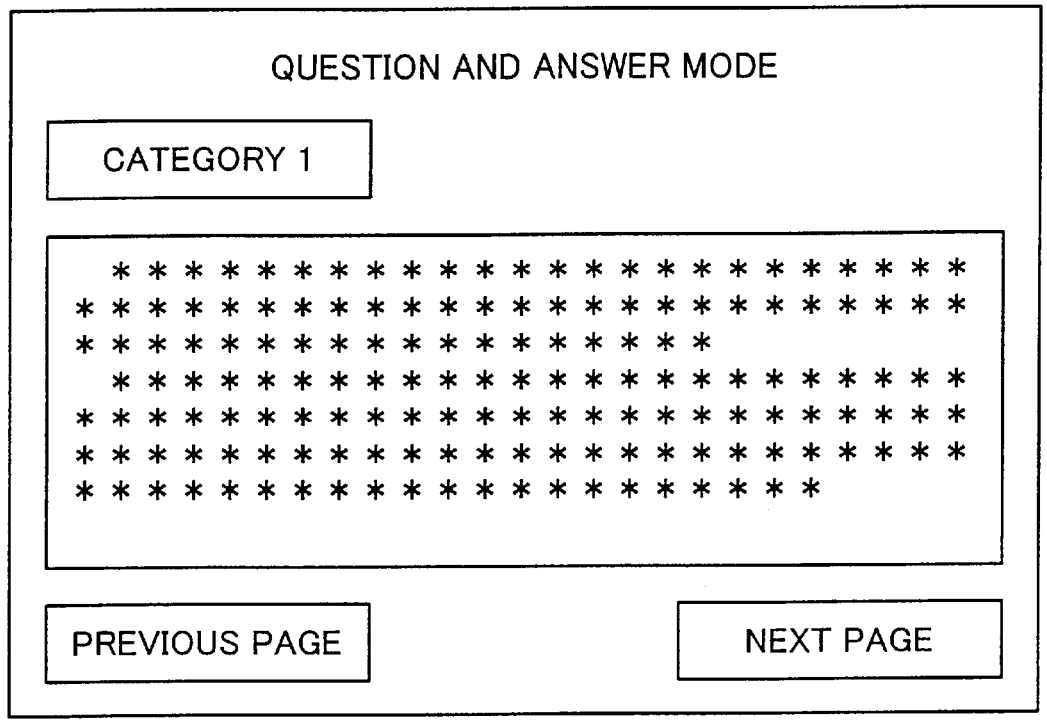
FIG. 10 is a diagram of an example in which notes about selected questions are displayed on the display device 480 of the remote control RC.

When the presenter selects a category corresponding to a question from a member of the audience from among the categories displayed on the display device 480 of the remote control RC, data related to the corresponding notes is transferred from the presentation device PC to the remote control RC, and the corresponding notes are displayed as shown in FIG. 10. The presenter is thus able to answer the question while referring to the displayed notes.

Figure 11:
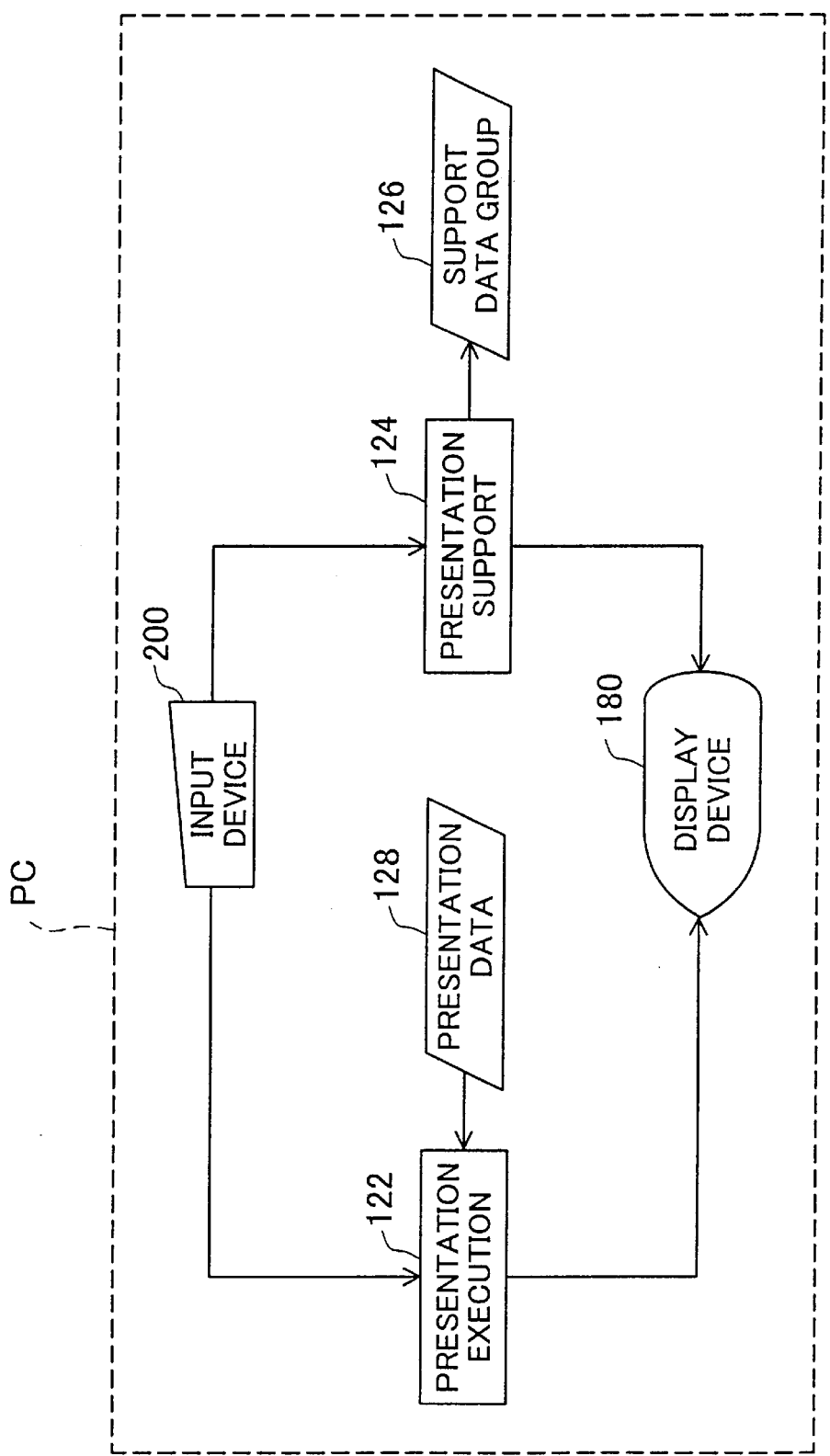
FIG. 11 is a diagram illustrating the functional structure of a presentation support system in the production of the support data group 126.

FIG. 11 is a diagram illustrating the functional structure of a presentation support system in the production of the support data group 126. The support data group 126 is produced by the presentation device PC in the presentation support system. The support data for the presentation mode is produced as follows. The presenter initiates a rehearsal of the presentation from the input device 200 of the presentation device PC, and the display of the presentation images is begun on the presentation execution section 122. A rehearsal is conducted for every presentation image on each page. At this point the data shown in FIG. 8 is input for every page from the input device 200. This input is performed according to the instructions on the display screen displayed on the display device 180 by the presentation data 128. The presentation support section 124 stores the input data as the support data group 126 in the memory 120 (FIG. 2). In actual practice, the support data group 126 is determined by repeating the rehearsal and adjusting the data for every presentation image while correcting the presentation images, revising the description, and so forth. The support data group 126 stored in the memory 120 is contained in the hard disk drive 190 (FIG. 2). The support data group 126 contained in the hard disk drive 190 is read out and stored in the memory 120 (FIG. 2) just before the presentation is conducted. The support data for the question and answer mode in FIG. 10 is produced in a similar manner.

If data related to notes for each page in the presentation mode, or data related to notes about the various question categories in the question and answer mode can be produced by the presentation execution section 122, as with PowerPoint, these data may be produced so as to be obtained from the presentation execution section 122.

As described above, the presentation support system in the above example allows support information for supporting a presentation to be displayed on the display device 480 of the remote control RC according to the progress status of the presentation. As a result, the presenter can easily ascertain how the presentation is proceeding, for example, and can therefore speed up or slow down the pace of the presentation so that the presentation can be conducted more efficiently and effectively.

Also, since messages are displayed on the remote control RC used to input various instructions and commands to the projector PJ, the presenter can easily check these messages while using the remote control RC to control the operation of the projector PJ in the course of a presentation. The display device 480 that displays these messages does not necessarily have to be included in the remote control RC, and may instead be provided to the presentation support system as a display device independent of the remote control RC.

As can be seen from the above description, the presentation device PC or the presentation support section 124 corresponds to the presentation support device of the present invention. Also, the controller 310 or the remote control controller 342 corresponds to the support controller of the present invention.

Part of the structure implemented by hardware in the above examples may be replaced with software, and conversely, part of the structure implemented by software in the above examples may be replaced with hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A presentation support system, comprising:

a projector configured to display presentation images to be used in a presentation;

a presentation support device configured to produce support information for supporting the presentation according to a progress status of the presentation, and to provide the support information to the projector; and a support information display device configured to display the support information, the projector being equipped with a support controller configured to supply the support information display device with the support information provided from the presentation support device, wherein the support information includes information indicating at least one of an elapsed time and a remaining time determined by monitoring the progress status of the presentation over time.

2. A presentation support system, comprising:

a projector configured to display presentation images to be used in a presentation;

a presentation support device configured to produce support information for supporting the presentation according to a progress status of the presentation, and to provide the support information to the projector; and a support information display device configured to display the support information, the projector being equipped with a support controller configured to supply the support information display device with the support information provided from the presentation support device, wherein the support information includes progress-related information obtained by comparing a progress determined by monitoring the progress status of the presentation over time with a previously registered progress.

3. A presentation support system as defined in claim 1, wherein the support information includes information indicating notes related to the presentation image being displayed.

4. A presentation support system as defined in claim 1, wherein the support information includes information indicating notes not related to the presentation image.

5. A presentation support system as defined in claim 1, wherein the support information display device is a remote control capable of communication with the projector.

6. A projector system, comprising:

a projector configured to display images; and a support information display device configured to display specific support information according to a progress status of a presentation, the projector being equipped with a support controller configured to supply the support information to the support information display device, wherein the support information includes information indicating at least one of an elapsed time and a remaining time determined by monitoring a progress status of the presentation over time.

7. A projector system, comprising:

a projector configured to display images; and a support information display device configured to display specific support information according to a progress status of a presentation, the projector being equipped with a support controller configured to supply the support information to the support information display device, wherein the support information includes progress-related information obtained by comparing a progress determined by monitoring the progress status of the presentation over time with a previously registered progress.

8. A projector system as defined in claim 6, wherein the support information includes information indicating notes related to the presentation image being displayed.

9. A projector system as defined in claim 6, wherein the support information includes information indicating notes not related to the presentation image.

10. A projector system as defined in claim 6, wherein the support information display device is a remote control capable of communication with the projector.

* * * * *

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

Column 8, line 26 through Column 10, line 19,
Replace Claim 1 with
1. A presentation support system, comprising:
a projector configured to display presentation images to be used in a presentation;
a presentation support device configured to produce support information for supporting the presentation according to a progress status of the presentation, and to provide the support information to the projector; and
a support information display device configured to display the support information,
the projector being equipped with a support controller configured to supply the support information display device with the support information provided from the presentation support device,
wherein the support information includes information indicating at least one of an elapsed time and a remaining time determined by monitoring the progress status of the presentation over time.

Replace Claim 2 with
2. A presentation support system, comprising:
a projector configured to display presentation images to be used in a presentation;
a presentation support device configured to produce support information for supporting the presentation according to a progress status of the presentation, and to provide the support information to the projector; and
a support information display device configured to display the support information,
the projector being equipped with a support controller configured to supply the support information display device with the support information provided from the presentation support device,
wherein the support information includes progress-related information obtained by comparing a progress determined by monitoring the progress status of the presentation over time with a previously registered progress.

Replace Claim 3 with
3. A presentation support system as defined in claim 1, wherein the support information includes information indicating notes related to the presentation image being displayed.

Replace Claim 4 with
4. A presentation support system as defined in claim 1, wherein the support information includes information indicating notes not related to the presentation image.

UNITED STATES PATENT AND TRADEMARK OFFICE
CERTIFICATE OF CORRECTION

PATENT NO.     : 6,715,881 B2
DATED          : April 6, 2004
INVENTOR(S)    : Shuichi Fujiwara It is certified that error appears in the above-identified patent and that said Letters Patent is hereby corrected as shown below:

<u>Column 8, line 26 through Colum 10, line 19 (cont'd),</u>
Replace Claim 5 with
5. A presentation support system as defined in claim 1, wherein the support information display device is a remote control capable of communication with the projector.

Replace Claim 6 with
6. A projector system, comprising:
a projector configured to display images; and
a support information display device configured to display specific support information according to a progress status of a presentation,
the projector being equipped with a support controller configured to supply the support information to the support information display device,
wherein the support information includes information indicating at least one of an elapsed time and a remaining time determined by monitoring a progress status of the presentation over time.

Replace Claim 7 with
7. A projector system, comprising:
a projector configured to display images; and
a support information display device configured to display specific support information according to a progress status of a presentation,
the projector being equipped with a support controller configured to supply the support information to the support information display device,
wherein the support information includes a progress-related information obtained by comparing a progress determined by monitoring the progress status of the presentation over time with a previously registered progress.

Replace Claim 8 with
8. A projector system as defined in claim 6, wherein the support information includes information indicating notes related to the presentation image being displayed.

Replace Claim 9 with
9. A projector system as defined in claim 6, wherein the support information includes information indicating notes not related to the presentation image.

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

<u>Column 8, line 26 through Column 10, line 19 (cont'd),</u>
Replace claim 10 with
10. A projector system as defined in claim 6, wherein the support information display device is a remote control capable of communication with the projector.

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

<u>Column 8, line 26 through Column 10, line 19,</u>
Delete claims 1-10 and insert therefor claims 1-8:

-- 1. A presentation support system, comprising:
a projector configured to display presentation images to be used in a presentation;
a presentation support device configured to produce support information for supporting the presentation according to a progress status of the presentation, and to provide the support information to the projector; and
a support information display device configured to display the support information,
the projector being equipped with a support controller configured to supply the support information display device with the support information provided from the presentation support device,
wherein the support information includes progress-related information indicating whether a user is on pace with a previously performed presentation, said progress-related information being obtained by comparing a time required for performing the previous presentation with a time spent performing a current presentation.

2. The presentation support system was defined in claim 1, wherein the support information includes information indicating notes related to the presentation image being displayed.

3. The presentation support system as defined in claim 1, wherein the support information includes information indicating notes not related to the presentation image.

4. The presentation support system as defined in claim 1, wherein the support information display device is a remote control capable of communication with the projector 5. A projector system, comprising:
a projector configured to display images; and
a support information display device configured to display specific support information according to a progress status of a presentation,
the projector being equipped with a support controller configured to supply the support information to the support information display device,
wherein the support information includes progress-related information indicating whether a user is on pace with a previously performed presentation, said progress-related information being obtained by comparing a time required for performing the previous presentation with a time spent performing a current presentation.

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

<u>Column 8, line 26 through Column 10, line 19 (cont'd),</u>

6. The projector system as defined in claim 5, wherein the support information includes information indicating notes related to the presentation image being displayed.

7. The projector system as defined in claim 5, wherein the support information includes information indicating notes not related to the presentation image.

8. The projector system as defined in claim 5, wherein the support information display device is a remote control capable of communication with the projector.--

This certificate supersedes Certificate of Correction issued August 2, 2005.

Signed and Sealed this

Sixth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

<u>Column 8, line 26 through Column 10, line 19,</u>
Delete claims 1-10 and insert therefor claims 1-8:

-- 1. A presentation support system, comprising:
a projector configured to display presentation images to be used in a presentation;
a presentation support device configured to produce support information for supporting the presentation according to a progress status of the presentation, and to provide the support information to the projector; and
a support information display device configured to display the support information,
the projector being equipped with a support controller configured to supply the support information display device with the support information provided from the presentation support device,
wherein the support information includes progress-related information indicating whether a user is on pace with a previously performed presentation, said progress-related information being obtained by comparing a time required for performing the previous presentation with a time spent performing a current presentation.

2. The presentation support system as defined in claim 1, wherein the support information includes information indicating notes related to the presentation image being displayed.

3. The presentation support system as defined in claim 1, wherein the support information includes information indicating notes not related to the presentation image.

4. The presentation support system as defined in claim 1, wherein the support information display device is a remote control capable of communication with the projector.

5. A projector system, comprising:
a projector configured to display images; and
a support information display device configured to display specific support information according to a progress status of a presentation,
the projector being equipped with a support controller configured to supply the support information to the support information display device,
wherein the support information includes progress-related information indicating whether a user is on pace with a previously performed presentation, said progress-related information being obtained by comparing a time required for performing the previous presentation with a time spent performing a current presentation.

UNITED STATES PATENT AND TRADEMARK OFFICE
CERTIFICATE OF CORRECTION

PATENT NO. : 6,715,881 B2
DATED : April 6, 2004
INVENTOR(S) : Shuichi Fujiwara

It is certified that error appears in the above-identified patent and that said Letters Patent is hereby corrected as shown below:

<u>Column 8, line 26 through Column 10, line 19 (cont'd),</u>

6. The projector system as defined in claim 5, wherein the support information includes information indicating notes related to the presentation image being displayed.

7. The projector system as defined in claim 5, wherein the support information includes information indicating notes not related to the presentation image.

8. The projector system as defined in claim 5, wherein the support information display device is a remote control capable of communication with the projector.--.

This certificate supersedes Certificate of Correction issued August 2, 2005 and December 6, 2005.

Signed and Sealed this

Thirtieth Day of May, 2006

JON W. DUDAS
*Director of the United States Patent and Trademark Office*